United States Patent [19]
Tyan et al.

[11] Patent Number: 5,693,200
[45] Date of Patent: Dec. 2, 1997

[54] FORMING A HIGH PERFORMANCE CO/PT DISK

[75] Inventors: Yuan-Sheng Tyan; Giuseppe Farruggia, both of Webster; Tukaram K. Hatwar, Penfield, all of N.Y.

[73] Assignee: Eastman Kodak Company, Rochester, N.Y.

[21] Appl. No.: 616,148

[22] Filed: Mar. 14, 1996

Related U.S. Application Data

[60] Provisional application No. 60/002,798 Aug. 25, 1995.
[51] Int. Cl.⁶ .................................................. C23C 14/34
[52] U.S. Cl. ............................... 204/192.26; 204/192.2
[58] Field of Search ........................ 204/192.2, 192.26

[56] References Cited

U.S. PATENT DOCUMENTS

| | | | |
|---|---|---|---|
| 5,068,022 | 11/1991 | Carcia | 204/192.15 |
| 5,082,749 | 1/1992 | Carcia | 428/699 |

FOREIGN PATENT DOCUMENTS

| | | |
|---|---|---|
| 0304873 | 8/1988 | European Pat. Off. . |
| 0304927 | 8/1988 | European Pat. Off. . |
| WO 91/08578 | 6/1991 | WIPO . |

OTHER PUBLICATIONS

"Co/Pt and Co/Pd Ultrathin Multilayered Films as New Magneto–Optical Recording Materials", by Y. Ochiai, et al, IEEE Transactions on Magnetics, vol. 25, No. 5, Sep. 1989, pp. 3755–3757.

"Dielectric Enhancement Layers for a Pt/Co Multilayer Magneto–Optical Recording Medium", by P. F. Carcia, et al, Appl. Phys. Lett. vol. 58(2), Jan. 14, 1991, pp. 191–193.

"Effect of Sputter–Deposition Processes on the Microstructure and Magnetic Properties of Pt/Co Multilayers", by P. F. Carcia, et al, Journal of Magnetism and Magnetic Materials vol. 121 (1993), pp. 452–460.

"Co/Pt and Co/Pd Multilayers as Magneto–Optical Recording Materials", by S. Hashimoto, et al, Journal of Magnetism and Magnetic Materials vol. 88 (1990), pp. 211–226.

"Hysteresis, Microstructure, and Magneto–Optical Recording in Co/Pt and Co/Pd Multilayers", by W. B. Zeper, et al, Journal Applied Physics vol. 70 (4), Aug. 15, 1991, pp. 2264–2271.

*Primary Examiner*—Aaron Weisstuch
*Attorney, Agent, or Firm*—Raymond L. Owens

[57] ABSTRACT

A method of forming a magneto-optical medium is disclosed. The method includes providing a seed layer on a substrate and forming a recording multilayer which includes sputtering at a pressure of greater than 15 mT alternating layers of Co/Pt to deposit them on said seed layer, wherein the seed layer is deposited at sputtering pressure of less than 5 mT and the seed layer material is selected to improve the coercivity and squareness of the Kerr hysteresis loop of the recording multilayer.

4 Claims, 10 Drawing Sheets

FORMING A HIGH PERFORMANCE CO/PT DISK

CROSS REFERENCE TO RELATED APPLICATION

Reference is made to and priority claimed from U.S. Provisional application Ser. No. US60/002,798, filed Aug. 25, 1995, entitled FORMING A HIGH PERFORMANCE CO/PT DISK.

The present application is related to U.S. application Ser. No. 08/076,326 filed Jun. 14, 1993 by Charles F. Brucker, Tukaram K. Hatwar and Yuan-Sheng Tyan,and entitled "Multilayer Magnetooptic Recording Media", now U.S. Pat. No. 5,407,755 issued Apr. 18, 1995; U.S. application Ser. No. 08/076,604 filed Jun. 14, 1993 by Tukaram K. Hatwar, Yuan-Sheng Tyan, Anthony C. Palumbo and Charles F. Brucker and entitled "Multilayer Magnetooptic Recording Media" now U.S. Pat. No. 5,565,266 issued Oct. 15, 1996; U.S. application Ser. No. 08/209,933 filed Mar. 11, 1994 by Tukaram K. Hatwar and Yuan-Sheng Tyan entitled "Multilayer Magnetooptic Recording Media" now U.S. Pat. No. 5,436,072 issued Jul. 25, 1995; U.S. application Ser. No. 08/316,743 filed Oct. 3, 1994 by Tukaram K. Hatwar and Yuan-Sheng Tyan entitled "Multilayer Magnetooptic Recording Media" now U.S. Pat. No. 5,563,000 issued Oct. 8, 1996; and U.S. application Ser. No. 08/615367 filed simultaneously herewith by Yuan-Sheng Tyan, G. Farruggia, and Tukaram K. Hatwar, and entitled "Optical Storage Medium Including Multiple Data Levels Made of Co/Pt Magneto-Optic Recording Media".

FIELD OF THE INVENTION

This invention relates to a magneto-optical disk With improved coerciviity and Keer hysteresis loop.

BACKGROUND OF THE INVENTION

Co/Pt multilayers have been used for magneto-optic recording media. These materials have perpendicular magnetic anisotropy, large Kerr rotations at short wavelengths and excellent environmental stability. However, these materials when deposited by conventional sputtering processes possess low coercivity. Attempts have been made to increase the coercivity by using seed layers of metals and dielectrics. (See Magnetooptic Recording Medium, European Patent Appln. 0304873 (1988); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. Vol. 58 (1991), pages 191–193. It was accepted that coercivity of sputtered Co/Pt superlattices increases when they are deposited at higher sputtering pressure of Ar, Kr or Xe. (Carcia et al J. Mag. Mag. Mat. Vol. 121(1993)452; Hashimoto et al J. Mag. Mag. Mat. Vol. 88(1990)211; Zeper et al J. Appl. Phys. Vol. 70(1991) 2264.) Sputtering at high pressure reduces bombardment by back-reflected neutrals and increases the magnetic coercivity. But the squareness of the Kerr hysteresis loop and the anisotropy energy is very small. The resulting Co/Pt film has poor crystalline quality and the optical noise is unacceptably high. For example, Ochiai et al IEEE Trans. Mag. Vol. 25, (1989)3755 and Ochiai European Patent Application 0 304 873 (1988) shows that squareness of the Kerr hysteresis loop deteriorates when magneto-optic layer sputtering pressure exceeds 15 mT. Similarly, Co/Pt film prepared by Carcia et al (1993) and JMMM 121 (1993) p, 452 have 960 Oe coercivity and 0.82 squareness at 7 mT Kr sputtering pressure and 2300 Oe coercivity and 0.1 squareness at 30 mT sputtering pressure. Thus, the useable sputtering pressure for depositing Co/Pt with satisfactory performance was limited to less than 15 mT. In fact, the International Patent Application #WO 91/08578 by Carcia, sets forth a preferred range of magnetooptic sputting gas pressure of about 2 to 12 mT.

SUMMARY OF THE INVENTION

It is an object of this invention to prepare a magneto-optic disk structure using Co/Pt superlattices with a very high coercivity and still maintaining a good squareness of the Kerr hysteresis loop and high anisotropy energy.

A further object of the present invention is to provide an improved media structure having a Co/Pt multilayer but with increased performance such as low media noise, high carrier to noise ratio, and improved manufacturing throughput.

We found unexpectedly that seed layers when deposited at low sputtering pressure of less than 5 mT Kr enhance the coercivity, squareness, and perpendicular anisotropy of Co/Pt multilayer. Such enhancement becomes even more pronounced when the thickness of the seed layer formed of indium-tin-oxide $((In_2O_3)_{1-x}(SnO_2)_x$, where x=0.25–0.75) is reduced below 16 nm.

The above objects are achieved in a method of forming a magnetooptical medium comprising the steps of:

a) providing a seed layer on a substrate; and b) forming a recording multilayer which includes sputter depositing alternating layers of Co/Pt at a pressure higher than 15 mT on said seed layer, wherein said seed layer is deposited at sputtering pressure of less than 5 mT and the seed layer material is selected to improve the coercivity and squareness of the Kerr hysteresis loop of the recording multilayer.

Advantages

The following are advantages of magneto-optic media made in accordance with this invention:

1) the resulting magneto optic medium has a large coercivity, high squareness of the Kerr hysteresis loop, high perpendicular anisotropy, low recording noise, and high carrier to noise ratio;

2) the method permits use of a very thin layer of Co/Pt for recording media and still possessing very high coercivity and squareness of the Kerr hysteresis loop; and 3) the thinness of the Co/Pt superlattice and ITO seed layer requires less deposition time and thus increases the production throughput during manufacturing.

DETAILED DESCRIPTION OF THE INVENTION

Figure 1:
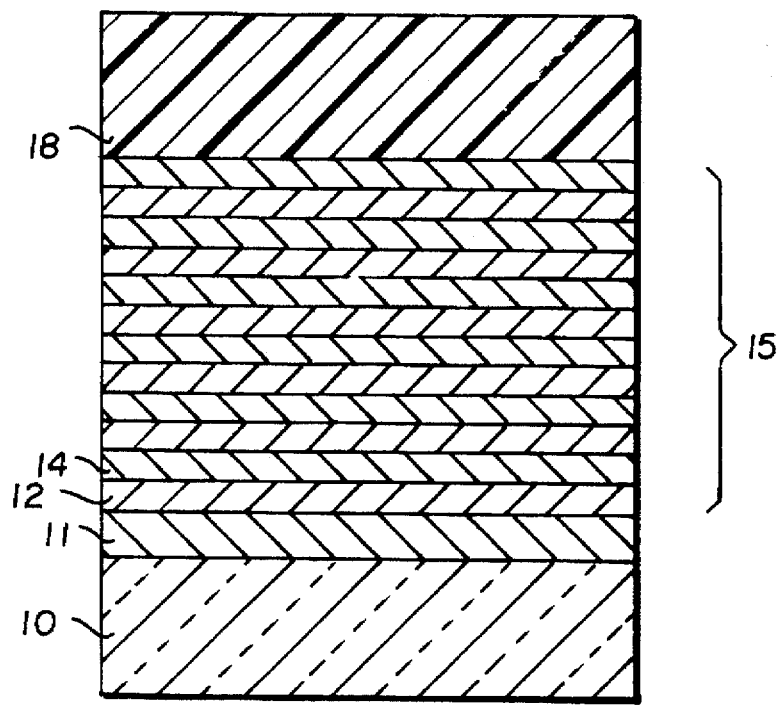
FIG. 1 shows a multilayer magneto optic disk structure made in accordance with the invention.

Turning first to FIG. 1, a schematic shows a substrate 10 which is made of polycarbonate and a seed layer 11 made of indium-tin oxide. There is shown a multilayer recording element 15 having alternating bilayers of Pt layer 12 and Co layer 14. Generally the substrate is transparent as light from a laser or other source will illuminate a recording multilayer structure as described through the substrate. On the substrate is provided a multilayer structure formed of alternating layers of Pt layer 12 and Co layer 14. Between the substrate and the multilayered recording element is the seed layer 11, which will be discussed later. Preferably, a UV curable lacquer overcoat 18 is provided on top of the multilayer structure. An example of such a lacquer is "Dyecure Clear SD-17", a UV curable acrylic resin available from Dainippon Ink and Chemicals, Inc. The lacquer is typically applied by a spin coating technique and cured in the presence of UV light. This structure is particularly suitable for use in magnetooptic disk, compact disk (CD), and photo compact disk (Photo CD).

With this type of structure, incident laser light illuminates a particular portion of the substrate, passes through the substrate, and interacts with the multilayered structure, changing the Kerr rotation. As is well known, during readout, the Kerr rotation can be monitored to indicate whether a bit has been recorded.

The seed layers made of indium-tin-oxide $((In_2O_3)_{1-x}(SnO_2)_x$, where x=0.25 –0.75) were prepared by d.c. sputtering a homogenous target having varying amounts of $In_2O_3$ and $SnO_2$ prepared by a hot press method. Kr gas was used for sputtering but other gases such as Ar, Xe or their mixture with or without oxygen content can be used. The sputtering pressure and deposition rate were 1–100 mT Kr and 0.2–1.2 nm/second, respectively.

Co/Pt multilayers were prepared by d.c. sputtering Co and Pt targets. The base pressure before depositing the structure was about $1\times10^{-5}$–$1\times10^{-6}$ Torr and deposition pressure was about 5–100 mT. Alternate layers of Co and Pt were deposited onto a substrate spinning at 20–250 revolutions per minute over the Co and Pt targets. The thickness of each layer was controlled by controlling the deposition rate and the substrate rotation speed. The thickness of Co and Pt were 0.2–0.8 and 0.4–1.8 nm respectively and the number of bilayers was 2–25. The deposition was done using Kr gas but other gases such as Ar, Xe or their mixtures can be used.

Several test samples were prepared by depositing the Co/Pt multilayers without and with seed layers on small test samples of glass and polycarbonate (PC) substrates. Structures were also deposited on the 5.25 inch dia. glass and PC substrates.

The perpendicular Kerr hysteresis loops were measured at 780 nm wavelength to obtain coercivity (Hc) and the Kerr rotation (θk) of the structures. The dynamic measurements of the magneto-optic structures were made under the following conditions: 6.03 m/sec disk velocity, 3.87 MHz carrier frequency, 90 ns pulse, 30 kHz bandwidth, 300 Oe bias field, 0–10 mW write power and 1.5–2.0 mw read power.

FIG. 2 shows the Kerr hysteresis loops obtained from a disk structure prepared by depositing 80 nm indium-tin oxide at 8 mT of krypton and twelve bilayers of Co/Pt deposited at varying pressure of Kr at 5–100 mT.

Figure 2A:
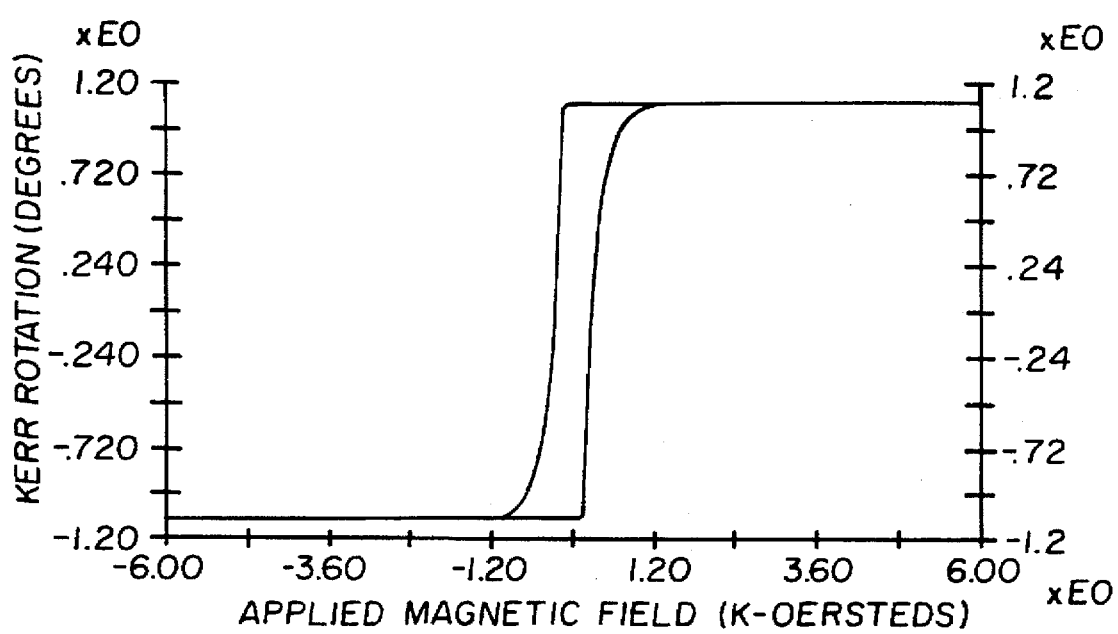
FIGS. 2A, 2B, 2C, 2D, 2E, 2F, and 2G show a series of Kerr hysteresis loops for Co/Pt multilayers which are a function of Co/Pt sputtering pressure and the seed layer of indium-tin-oxide is selected to have a thickness of 80 nm and was deposited at 8 mT.
Figure 2B:
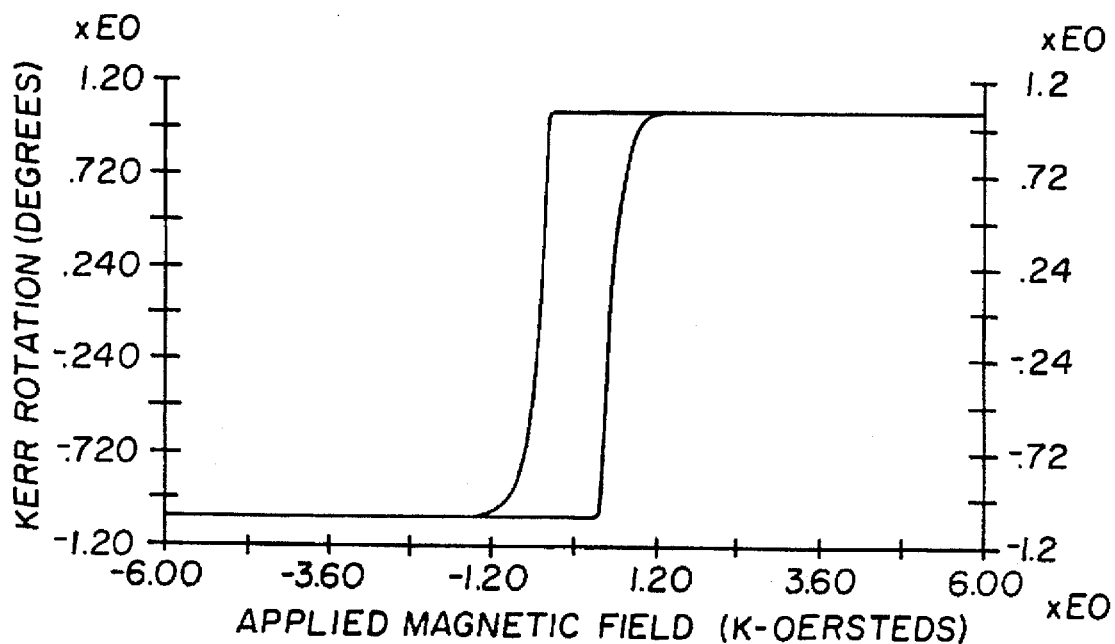
Figure 2C:
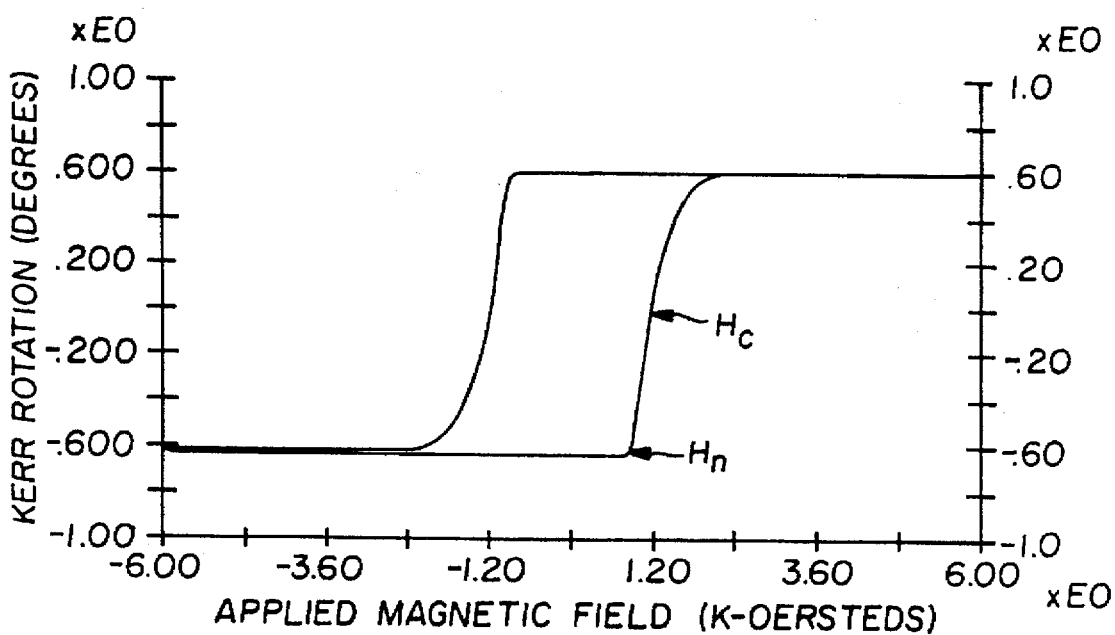
Figure 2D:
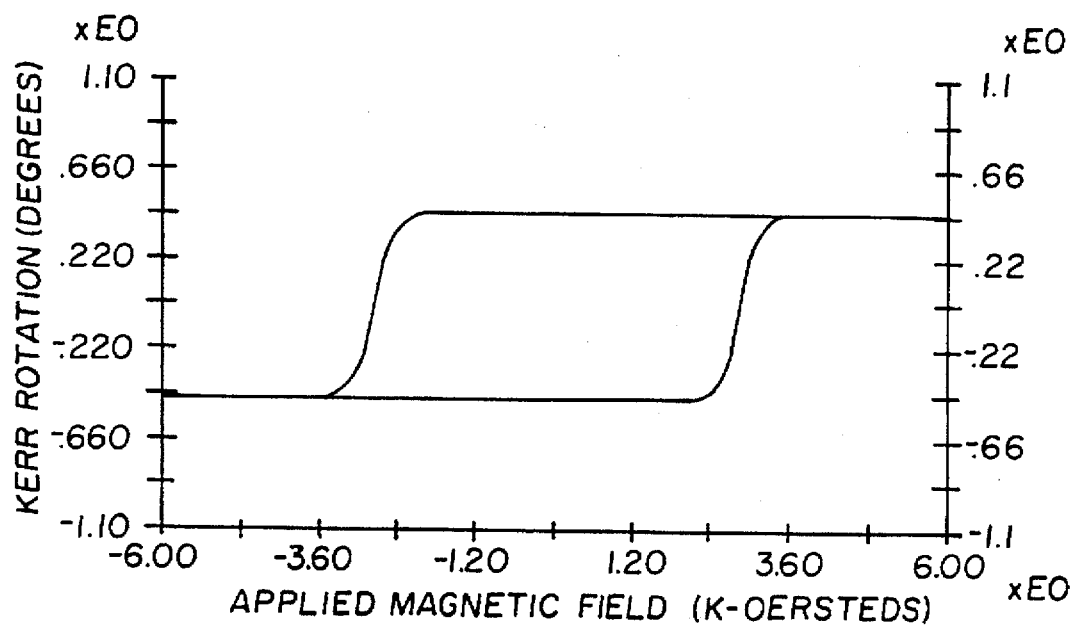
Figure 2E:
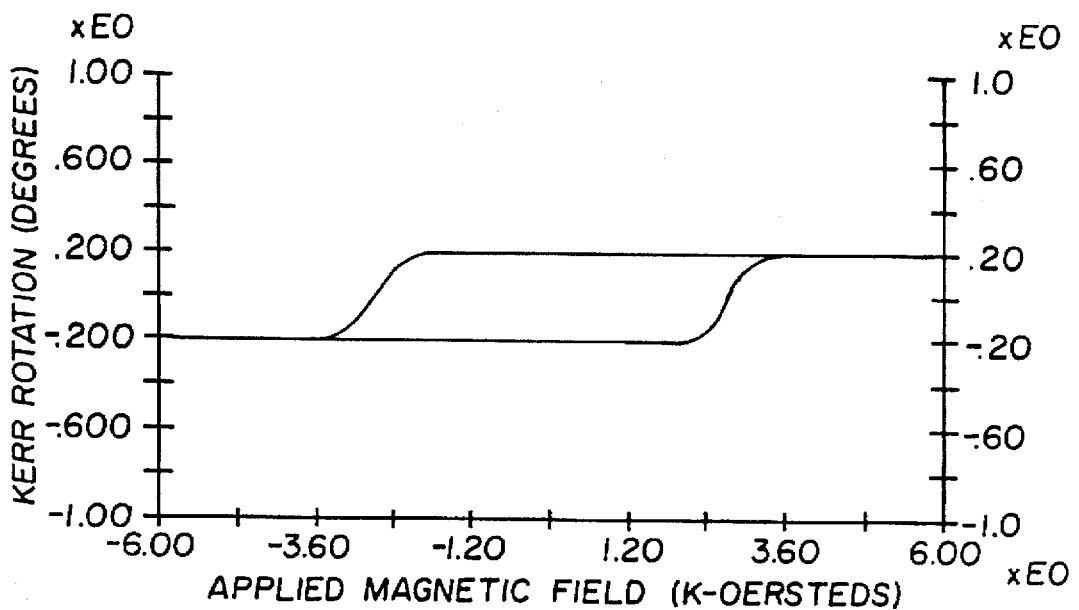
Figure 2F:
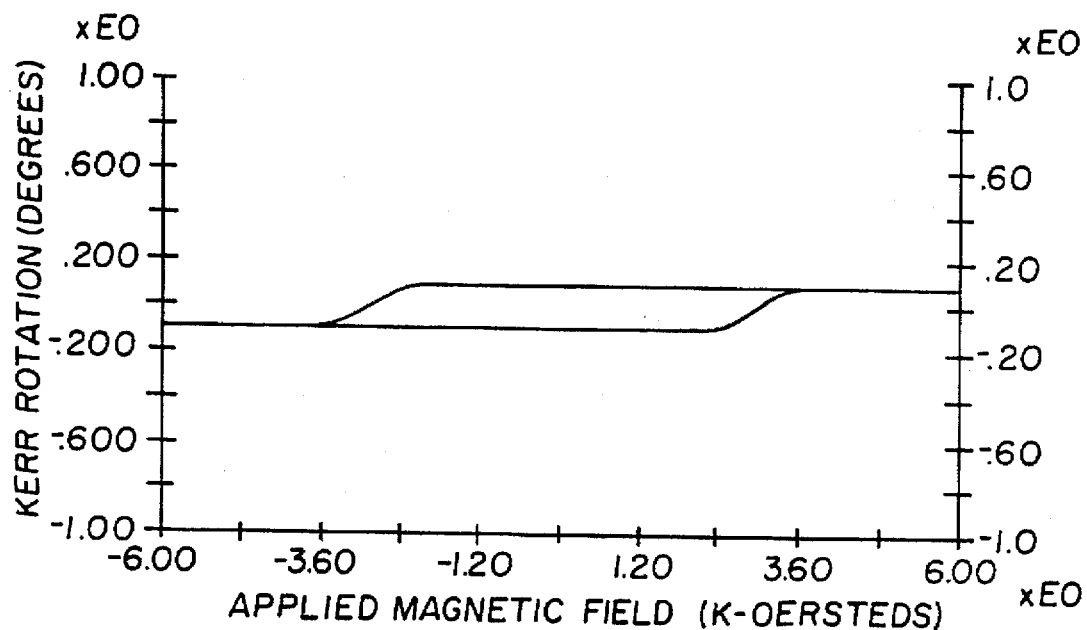
Figure 2G:
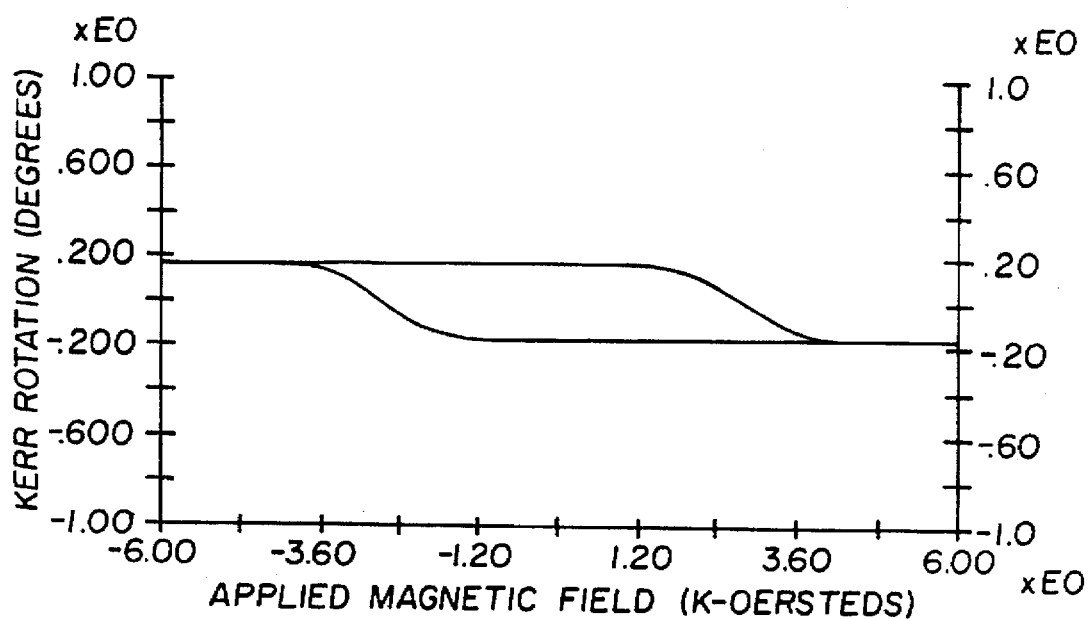

Turning to FIG. 2A, the sputtering pressure of Kr was at 5 mT, and FIG. 2B at 15 mT, FIG. 2C at 25 mT, FIG. 2D at 40 mT, FIG. 2E at 60 mT, 2F at 80 mT, and 2G at 100 mT;

The squareness of the Kerr hysteresis loop is defined as the ratio of the coercivity $H_c$ and the nucleation field $H_n$ (see FIG. 2C and the reference Zeper et al J. Appl. Phys. Vol. 70 (1991) p. 2265). For a perfectly square loop, this ratio is unity because $H_{c=Hn}$. For satisfactory performance of the disk, i.e. to have lower disk noise and higher carrier to noise ratio, this ratio should be closer to unity. As the Kerr loop becomes slanted or skewed, the squareness of the loop decreases, and this ratio becomes smaller than unity. The Kerr loop of FIG. 2A and FIG. 2B have high squareness but low coercivity. When Co/Pt film of FIG. 2C is deposited at higher Kr pressure, coercivity of the film increases and the squareness of the loop and the Kerr rotation decreases. The Co/Pt films of FIGS., 2D, 2E, 2F and 2G prepared at sputtering pressure greater than 15 mT of Kr possess high coercivity but very low squareness and these films are not suitable for magneto-optic recording.

Figure 3:
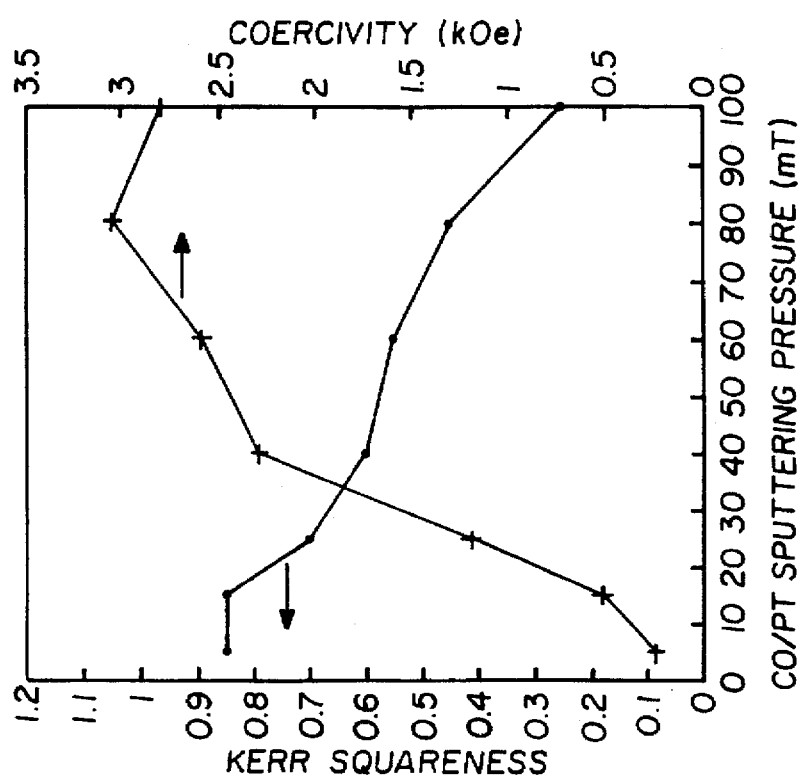

FIG. 3 shows the plots of coercivity and Kerr squareness as a function of Co/Pt sputtering pressure of the films in FIG. 2. As noted above, the coercivity of the Co/Pt structure increases with the increasing sputtering pressure. However, simultaneously the squareness or the rectangular ratio of the Kerr loop decreases. In fact, the Kerr loop loses it squareness significantly when Co/Pt sputtering pressure of kryton exceeds 15 mT. This behaviour is similar to that observed in the prior art.

Figure 4:
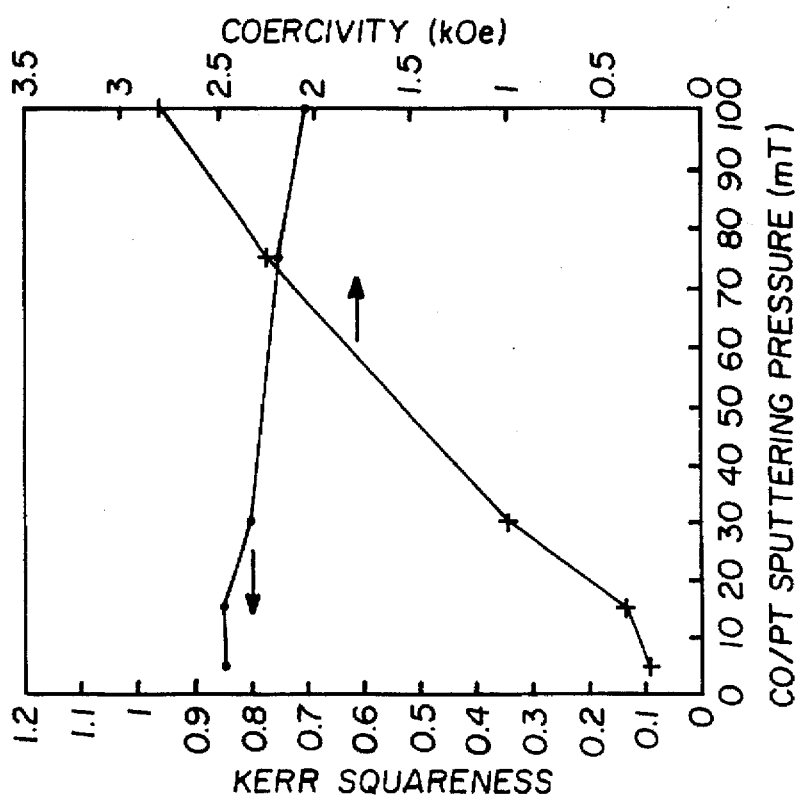
FIGS. 3–5 are plots which shows coercivity and Kerr hysteresis loop squareness versus Co/Pt multilayer sputtering pressure, in FIG. 3 the seed layer has a thickness of 80 nm and the sputtering pressure is 8 mT, in FIG. 4, the indium-tin-oxide seed layer is also 80 nm deposited at sputtering pressure of 1 mT, and in FIG. 5, the seed layer is indium-tin-oxide and has a thickness of 3.5 nm and deposited at a sputtering pressure of 8 mT.

FIG. 4 shows the coercivity and squareness of the Kerr hysteresis loops of the Co/Pt film as a function of Co/Pt sputtering pressure where an indium-tin-oxide seed layer 80 nm thick was deposited at a sputtering pressure (Kr gas) of 1 mT. Again, the coercivity increases with the sputtering pressure. But the squareness of the Kerr loop does not deteriorate as fast as that seen in FIG. 3. Thus, improvement in the Kerr loop squareness is obtained by depositing indium-tin-oxide seed layer at lower sputtering pressure.

Figure 5:
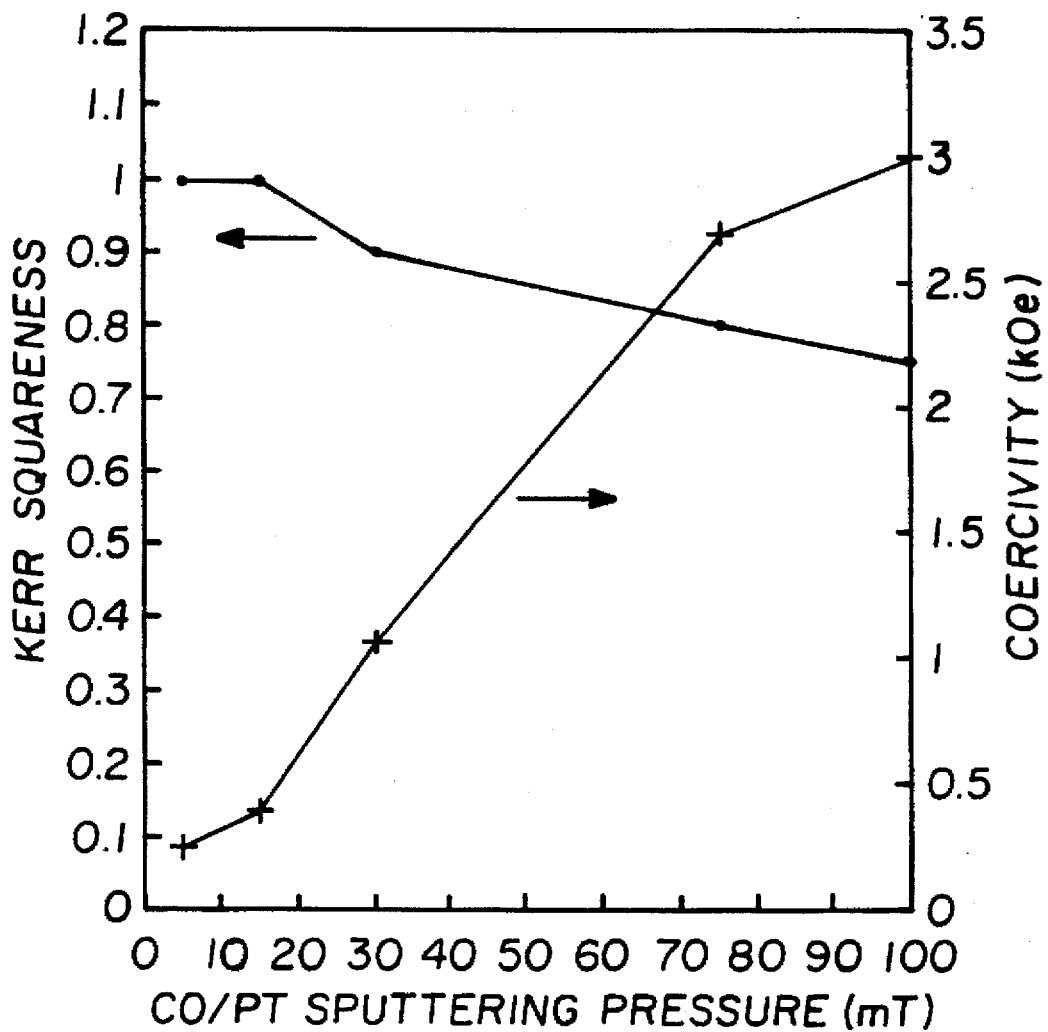
Figure 6A:
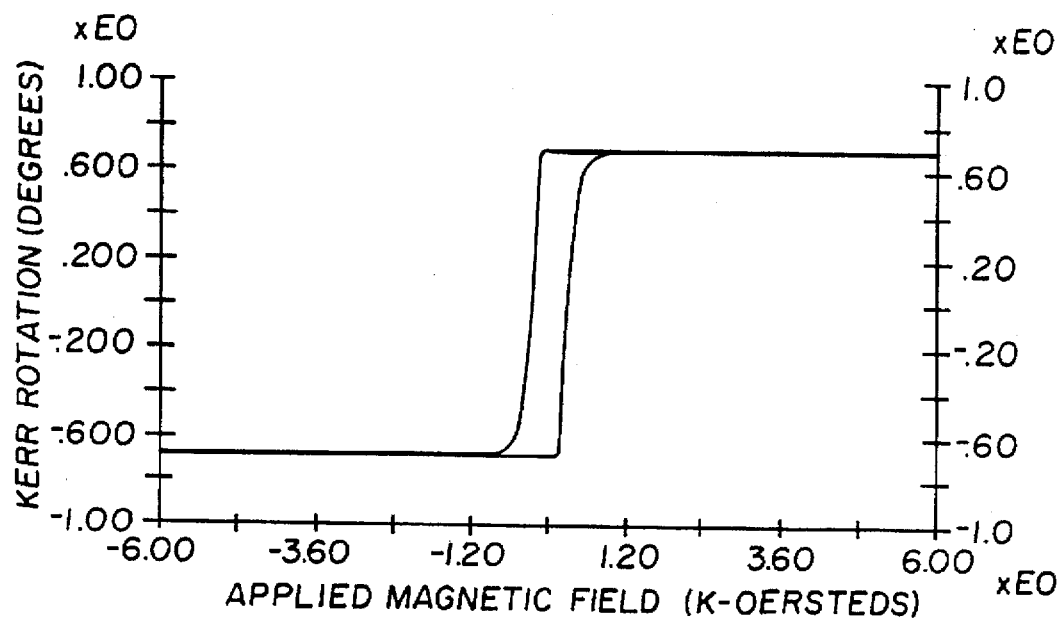
FIGS. 6A, 6B, 6C, 6D, 6E, 6F, and 6G are a series of Kerr hysteresis loops for Co/Pt multilayers which are a function of Co/Pt sputtering pressure and the seed layer of indium-tin oxide is selected to have a thickness of 3.5 nm deposited at 1 mT.
Figure 6B:
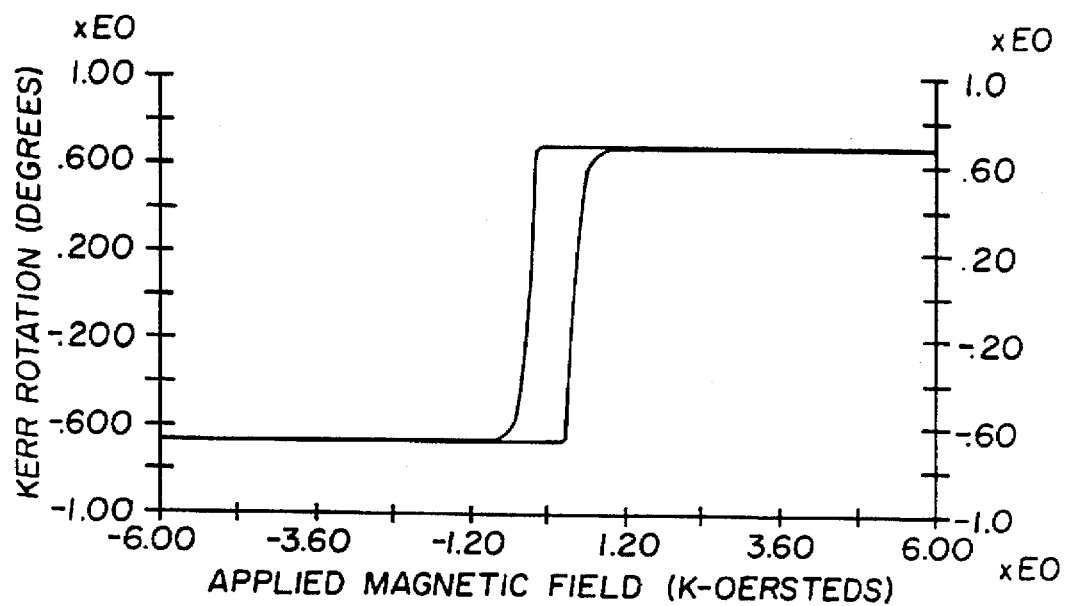
Figure 6C:
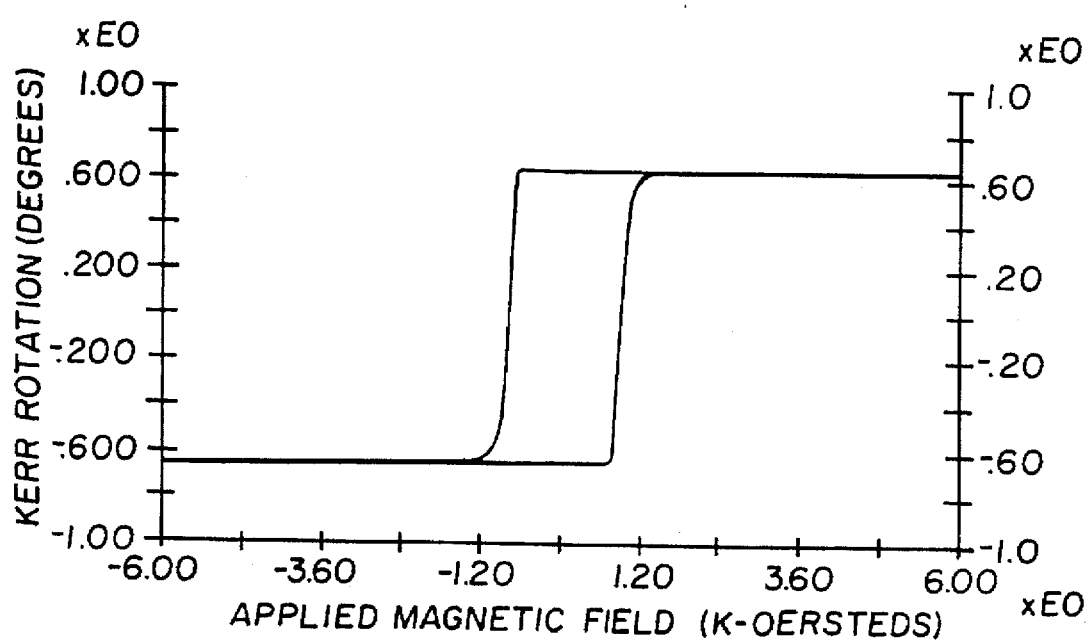
Figure 6D:
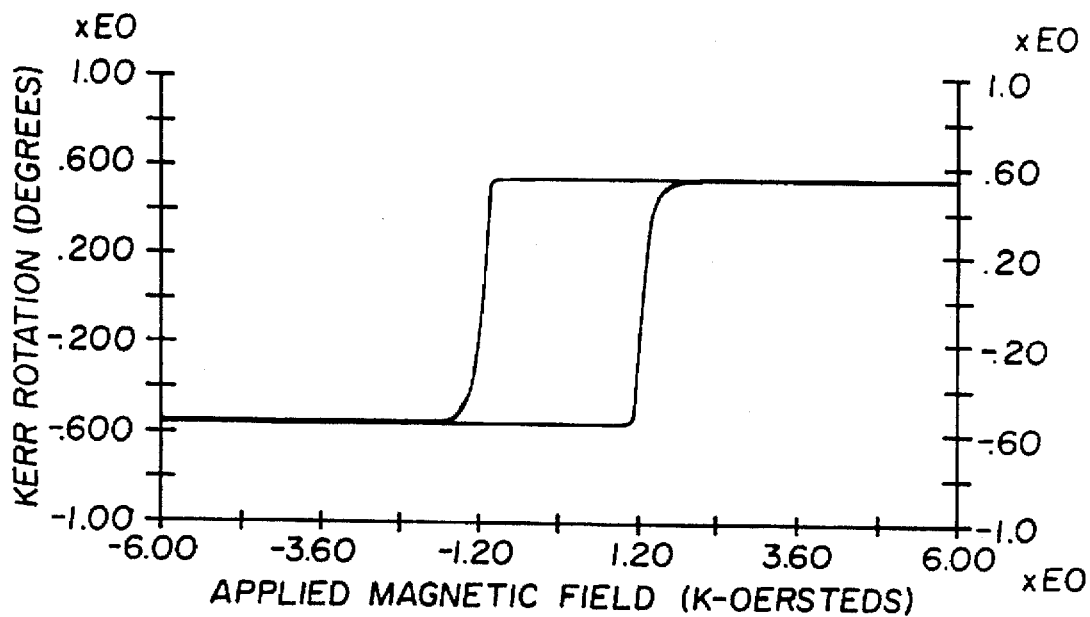
Figure 6E:
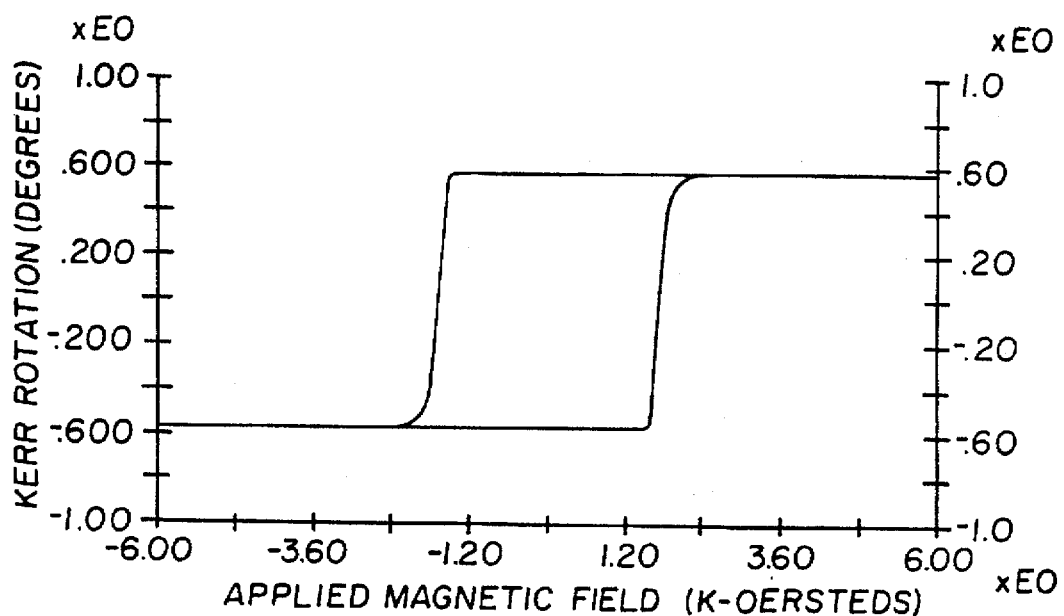
Figure 6F:
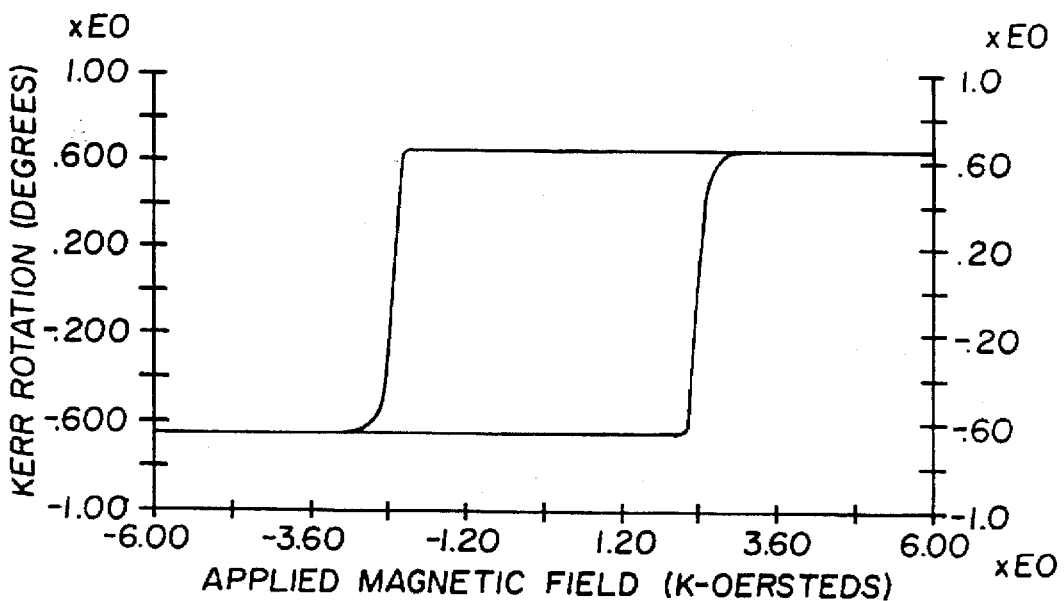
Figure 6G:
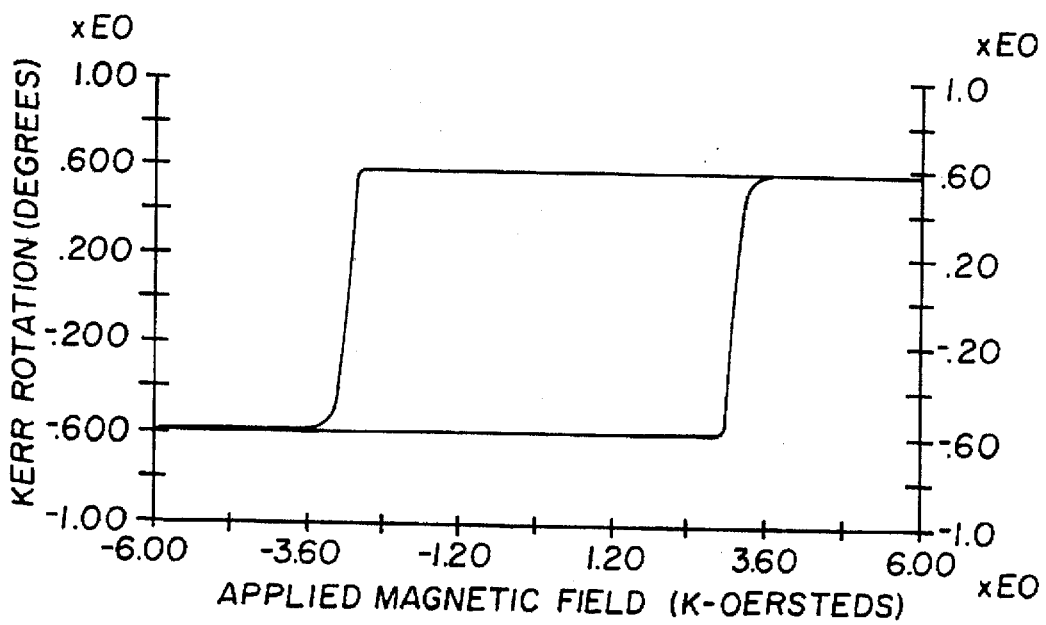

FIG. 5 shows the coercivity and squareness of the Kerr hysteresis loops of the Co/Pt film as a function of Co/Pt sputtering pressure where an indium-tin-oxide seed layer of 3.5 nm thick was deposited at a Kr gas pressure of 8 mT. The coercivity increases with the sputtering pressure as seen above. However, as compared to that with FIG. 3, the structure of FIG. 5 using a thin indium-tin-oxide seed layer shows a higher squareness throughout the Co/Pt sputtering pressure range.

FIG. 6 shows the Kerr hysteresis loops of the Co/Pt films as a function of Co/Pt sputtering pressure where a 3.5 nm indium-tin oxide seed layer was deposited at a Kr gas pressure of 1 mT. Turning to FIG. 6A, the Co/Pt sputtering pressure of Kr was at 5 mT, and FIG. 6B at 15 mT, FIG. 6C at 25 mT, FIG. 6D at 40 mT, FIG. 6E at 60 mT, 6F at 75 mT, and 6G at 100 mT. Again, as seen above, the coercivity increases with the Co/Pt sputtering pressure. Simultaneously, the squareness of the Kerr loop is significantly improved, even in the Co/Pt films prepared at greater than 15 mT Kr pressure. This improvement in the squareness of the Kerr loop reduced the writing noise during recording.

Figure 7:
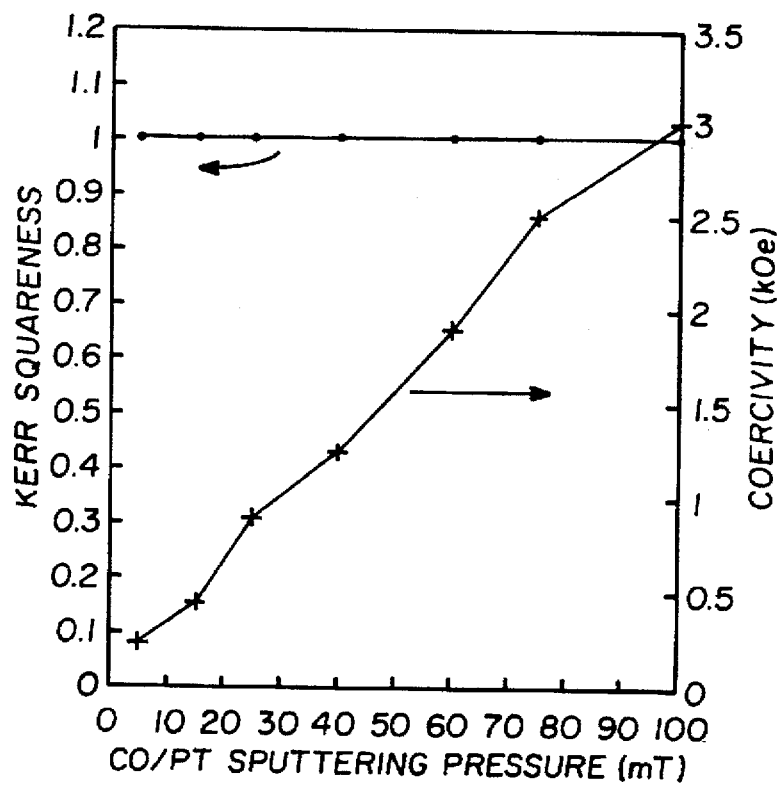
FIG. 7 is a plot which shows coercivity and Kerr hysteresis loop squareness versus Co/Pt multilayer sputtering pressure of FIG. 6 wherein the seed layer of indium-tin-oxide is selected to have a thickness of 3.5 nm and was deposited at 1 mT.

FIG. 7 shows the squareness ratio and the coercivity of the films in FIG. 6 as a function of Co/Pt sputtering pressure. As noted above, coercivity increases monotonically and consistently a squareness closer to unity is maintained. In fact, the highest squareness is obtained for these structures as compared to that of FIGS. 2–5. Moreover, the Kerr loop maintains its perfect squareness at least until the Co/Pt sputtering pressure of 100 mT.

Several full structure disks were prepared and their dynamic performance was measured for carrier, noise, and carrier to noise ratio (CNR). It was found that significantly lower noise and higher CNR was obtained where the seed layer was deposited at sputtering pressure of less than 5 mT Kr and the Co/Pt multilayer was deposited above 15 mT Kr.

In the above examples, results were described using indium-tin-oxide seed layers. We also used other seed layers such as ZnO, Zn-Sn-O, and SiC and found similar beneficial effects as above when the seed layer of thickness less than 16 nm were deposited below sputtering pressure of 5 mT.

The invention has been described in detail with particular reference to certain preferred embodiments thereof, but it will be understood that variations and modifications can be effected within the spirit and scope of the invention.

We claim:

1. A method of forming a magneto-optical medium comprising the steps of:

a) providing a seed layer which includes $(In_2O_3)_{1-x}(SnO_2)_x$, where $x=0.25-0.75$ on a substrate; and b) forming a recording multilayer which includes sputtering alternating layers of Co and Pt on said seed layer, wherein the sputtering pressure for making the recording layer is above 15 mT, wherein said seed layer is deposited at sputtering pressure of less than 5 mT, the seed layer material is selected to improve the coercivity and squareness of the Kerr hysteresis loop of the recording multilayer, and wherein said seed layer has a thickness of less than or equal to 16 nm.

2. The method of claim 1 wherein a sputtering gas selected from the group consisting of Ar, Kr, Xe, and their mixtures is used to sputter the Co and Pt multilayer.

3. The method of claim 1, further providing a UV curable lacquer overcoat over the recording layer.

4. The method of claim 1, wherein said multilayer contains 2–25 bilayers of Co and Pt, the thickness of each of the Co and Pt layers being uniform and between 0.2 to 0.8 nm and 0.4 to 1.8 nm, respectively.

* * * * *